US011337114B2

(12) United States Patent
Berg et al.

(10) Patent No.: US 11,337,114 B2
(45) Date of Patent: May 17, 2022

(54) METHOD AND TRANSITION DEVICE FOR ENABLING COMMUNICATION OF DATA IN A WIRELESS NETWORK

(71) Applicant: TELEFONAKTIEBOLAGET LM ERICSSON (PUBL), Stockholm (SE)

(72) Inventors: Miguel Berg, Sollentuna (SE); Per-Erik Eriksson, Stockholm (SE); Chenguang Lu, Sollentuna (SE); Jacob Österling, Järfälla (SE); Elmar Trojer, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 194 days.

(21) Appl. No.: 16/628,890

(22) PCT Filed: Aug. 17, 2017

(86) PCT No.: PCT/SE2017/050828
§ 371 (c)(1),
(2) Date: Jan. 6, 2020

(87) PCT Pub. No.: WO2019/035750
PCT Pub. Date: Feb. 21, 2019

(65) Prior Publication Data
US 2020/0236592 A1   Jul. 23, 2020

(51) Int. Cl.
*H04W 28/10* (2009.01)
*G06F 9/455* (2018.01)
(Continued)

(52) U.S. Cl.
CPC ........ *H04W 28/10* (2013.01); *G06F 9/45558* (2013.01); *H04L 27/2636* (2013.01);
(Continued)

(58) Field of Classification Search
CPC ..... H04W 28/10; H04W 28/06; H04W 80/02; H04W 88/085; H04W 88/181;
(Continued)

(56) References Cited

U.S. PATENT DOCUMENTS 10,345,438 B2 *  7/2019  Gander ................ G01S 11/023
10,609,582 B2 *  3/2020  Hannan ................ H04B 17/345
(Continued)

FOREIGN PATENT DOCUMENTS

WO    2012171133 A1   12/2012
WO    2017035724 A1    3/2017

OTHER PUBLICATIONS

3GPP TR 38.801 V2.0.0, "3rd Generation Partnership Project; Technical Specification Group Radio Access Network Study on New Radio Access Technology; Radio Access Architecture and Interfaces (Release 14)," Technical Report, Mar. 2017, pp. 1-90, Valbonne, France, http://www.3gpp.org.

(Continued)

*Primary Examiner* — Habte Mered
(74) *Attorney, Agent, or Firm* — Patent Portfolio Builders PLLC

(57) ABSTRACT

A method and transition device for enabling communication of data between a remote radio unit and a central baseband unit in a wireless network. When detecting a first interface configuration used by the remote radio unit and a second interface configuration used by the baseband unit, the transition device configures interface functions, based on the first and second interface configurations. The interface functions are selected from a set of predefined interface functions associated with different interface configurations. The transition device then establishes a data flow between the remote radio unit and the central baseband unit over the transition device, and performs conversion between the first interface (Continued)

configuration and the second interface configuration for data communicated in the data flow, using the selected interface functions.

21 Claims, 9 Drawing Sheets

(51) Int. Cl.
  *H04L 27/26* (2006.01)
  *H04W 28/06* (2009.01)
  *H04W 80/02* (2009.01)
  *H04W 88/08* (2009.01)

(52) U.S. Cl.
  CPC ........... *H04W 28/06* (2013.01); *H04W 80/02* (2013.01); *H04W 88/085* (2013.01); *G06F 2009/45595* (2013.01)

(58) Field of Classification Search
  CPC ................ H04W 24/02; G06F 9/45558; G06F 2009/45595; H04L 27/2636; H04L 41/0853; H04L 41/0886
  See application file for complete search history.

(56) References Cited

U.S. PATENT DOCUMENTS

| | | | | |
|---|---|---|---|---|
| 10,616,800 | B2* | 4/2020 | Zhang | H04W 88/08 |
| 10,727,896 | B2* | 7/2020 | Lv | H04B 1/525 |
| 2014/0198684 | A1* | 7/2014 | Gravely | H04L 43/18 370/254 |
| 2016/0316463 | A1* | 10/2016 | Liu | H04W 72/1263 |
| 2017/0373890 | A1* | 12/2017 | Fertonani | H04B 1/1661 |
| 2018/0124482 | A1* | 5/2018 | Bottari | H04Q 11/0066 |
| 2018/0191873 | A1* | 7/2018 | Bao | H04L 7/0008 |
| 2018/0192323 | A1* | 7/2018 | Zhang | H04W 28/065 |
| 2019/0319742 | A1* | 10/2019 | Wu | H04J 3/1658 |

OTHER PUBLICATIONS

CPRI Specification V5.0, "Common Public Radio Interface (CPRI); Interface Specification," Sep. 21, 2011, pp. 1-119, Retrieved from the Internet:URL:http://www.cpri.info/downloads/CPRI_v_5_0_2011-09-21.pdf, XP055033500.

CPRI Specification V7.0, "Common Public Radio Interface (CPRI); Interface Specification," Oct. 9, 2015, pp. 1-128.

Ericsson Technology Review, "4G/5G RAN Architecture: How a Split can Make the Difference," 2016, pp. 1-15, Charting the Future of Innovation, vol. 93, No. 6.

Ericsson Technology Review, "5G and Fixed Wireless Access," 2016, pp. 1-15, Charting the Future of Innovation, No. 10.

Intel Corporation, "RAN PHY Functions Split Options," 3GPP TSG RAN WG3, Meeting #92, Nanjing, China; Apr. 23-27, 2016, 4 pages, R3-161259, Retrieved from the Internet: URL:http://www.3gpp.org/ftp/Meetings_3GPP_SYNC/RAN3/Docs, XP051106061.

International Search Report / Written Opinion in related/corresponding PCT Application No. PCT/SE2017/050828 dated Mar. 13, 2018.

Nec, Kddi, "Options of Functionality Splitting in RAN logical architecture," 3GPP TSG RAN WG3 meeting #91bis, Bangalore, India, Apr. 11-15, 2016, 5 pages, Retrieved from the Internet: URL:http://www.3gpp.org/ftp/tsg_ran/WG3_lu/TSGR3_91bis/Docs, XP051082978.

Samsung, "Function split between central and remote node," 3GPP TSG-RAN WG3 Meeting #91 bis, Bangalore, India, Apr. 11-15, 2016, R3-160679, 3 pages, Retrieved from the Internet: URL:http://www.3gpp.org/ftp/tsg_ran/WG3_lu/TSGR3_91bis/Docs, XP051082881.

Examination Report in related European Application No. 17758653.4, dated Nov. 30, 2021, 7 pages.

* cited by examiner

METHOD AND TRANSITION DEVICE FOR ENABLING COMMUNICATION OF DATA IN A WIRELESS NETWORK

TECHNICAL FIELD

The present disclosure relates generally to a method and a transition device, for enabling communication of data between a remote radio unit and a central baseband unit in a wireless network.

BACKGROUND

In wireless networks, it has been proposed to split functionality required for handling radio communication with wireless devices, normally provided in a radio network node such as a base station, into a remote part and a central part, herein referred to as a "remote radio unit" (RRU) and a "baseband unit" (BBU), respectively. A single centralized baseband unit equipped with processing means may thus be connected to multiple remote radio units equipped with antennas, so that radio signals communicated locally by several remote radio units are processed centrally by the baseband unit. Thereby, a large number of remote radio units employed in the network for transmitting and receiving radio signals can be designed very simple at low costs without advanced processing means, while the baseband unit provides the necessary functionality for processing signals and their contents.

The BBU can also be capable of handling several different protocols and functions, depending on which Radio Access Technology (RAT) and/or type of Radio Access Network (RAN) are used by the respective RRUs. FIG. 1 illustrates a simplified wireless network where a central baseband unit BBU 100 is connected to multiple remote radio units RRUs 102 equipped with antennas, which may include a single antenna on some RRUs and multiple antennas on other RRUs, as schematically indicated. Although the RRUs 102 are shown with a single antenna in this example, each RRU may comprise any number of antennas and when beamforming and/or Multiple-Input-Multiple-Output (MIMO) are employed, a RRU may have a large number of antennas and a data flow may be needed for each antenna. For example, radio signals received by the RRUs 102 in uplink communication are conveyed to the BBU 100 in the form of In-phase/Quadrature (IQ) samples using a so-called Common Public Radio Interface (CPRI).

Currently, the above-described functionality split can be implemented for multi-standard RANs, e.g. involving 2G/3G/4G networks, based on the interface between RRU and BBU, e.g. the above-mentioned CPRI. As indicated above, the RRUs 102 handle various radio functions for one or more antennas, which for downlink transmission typically include power amplification, filtering, digital pre-distortion, etc., which are usually frequency band-specific. Radio functions for uplink reception typically include RF filtering, Low-Noise Amplification, automatic gain control, down-conversion, A/D conversion, carrier de-multiplexing, and carrier filtering.

The RRUs 102 further perform a conversion between Radio Frequency (RF) signals and IQ samples and transport the IQ samples in so-called antenna-carriers (AxC) via the CPRI interface. An antenna carrier is basically an IQ sample flow corresponding to one radio carrier on one antenna. The above radio functions are thus basically employed for uplink communication and corresponding radio functions can be employed in the RRUs 102 for downlink communication when IQ samples received from the BBU 100 are converted into RF signals for transmission from the RRUs 102.

CPRI has been specified by the CPRI Industry Cooperation for use as a fronthaul (FH) interface in wireless networks, and CPRI is widely adopted in wireless networks of today. Basically, CPRI specifies the protocol for the current RRU-BBU interface, transporting the baseband IQ samples and any related signaling. Such an RRU-BBU function split is often referred to as an RF-PHY split, as RF functions are implemented in the RRUs while the processing of the physical layer, referred to as PHY, and above protocol layers is made in the BBU.

CPRI enables the RF-PHY split design of distributing radio functionality to multiple distributed RRUs while baseband functionality is centralized to one or more BBUs. CPRI further provides a means that multiplexes/de-multiplexes signals of different flows and manages AxCs between BBU and RRUs. CPRI also supports various existing RATs, such as 2G, 3G and 4G, as well as different transmission modes, such as frequency division duplex (FDD) and time division duplex (TDD), and signal configurations e.g. related to carrier bandwidth, layers of diversity/MIMO, spatial beamforming, etc., in a uniform stream format over electrical and optical interfaces.

CPRI can be used to transport IQ samples as well as signals related to synchronization, fast Layer 1 signaling, configuration and management (C&M), and allows for vendor specifics and protocol extension. All this functionality can be efficiently realized in a duplex point-to-point fiber such as a daisy-chain, ring or star.

However, the current CPRI-based RF-PHY split may be too costly for deployment in a network designed for 5G for the following reasons. In 5G, the carrier bandwidth, e.g. 200 MHz, and the number of antennas, e.g. 64, 128 or 256, are dramatically increased as compared to 4G which normally uses a 20 MHz carrier bandwidth with 8 or 16 antennas at the most. When moving from 4G to 5G, the required FH capacity may be increased from supporting one or a few gigabit/second speeds to supporting several 100 gigabit/second speeds. To cope with this increase of required capacity, there are mainly two alternatives available as follows.

1) One alternative is to compress the FH data which enables the RF-PHY split of 4G to be kept. This is especially conceivable when the number of antennas is not too high, e.g. no more than 64 antennas. This facilitates reuse of existing designs of RRU and BBU. Compression of FH data means basically using an IQ sample representation with reduced bit rate. A lower bit rate can be achieved e.g. by reducing the number of quantization steps and/or by reducing the sample rate of the time domain signal. Other techniques are also possible, e.g. entropy coding and/or transform coding. If the IQ samples are compressed too much, the signal quality could be degraded, which may lead to reduced radio performance.
2) Another alternative is to use another functional split at a higher position in the protocol stack, which requires new designs of the RRUs and the BBU. For example, the split may be realized between MIMO processing, e.g. beamforming, and user-layer processing when multiple antennas are used at the RRUs. When this example is used for uplink communication, the new RRU transforms AxC signals to frequency domain by performing OFDM demodulation including synchronization, Cyclic Prefix (CP) removal and a Fast Fourier Transform (FFT) operation. For downlink, a corresponding OFDM modulation is performed. The RRU further performs beamforming/MIMO processing to separate user layers, and then the processed user-layer samples are conveyed to the new BBU. An evolved CPRI being currently specified is called eCPRI which supports a functional split within the PHY, enabling a ten-fold reduction of the required bandwidth.

It should be noted that the functional split may be vendor-specific. Different vendors may thus have different implementation variants on the same level of a split, for example, within the PHY layer. In general, it is a problem that an interface must be adapted and established manually between each RRU and a BBU, e.g. as shown in FIG. 1, so as to fulfil the specific capabilities and requirements of said RRU and BBU, and # a given RRU typically supports one CPRI rate only so that any changes of RRUs and BBUs often require manual operations.

US 2014/0198684 A1 discloses an interceptor system that can operate as an inter-operability bridge between a Radio Equipment Controller (REC) which is a baseband processing unit, and a Remote Radio Head (RRH), which nodes are incompatible. The interceptor system can provide translations or conversion of data between the REC and the RRH.

WO 2012/171133 A1 discloses a rate matching device having a first interface between a Radio Equipment Control node (REC) and the rate matching device, and a second interface between the rate matching device and a Radio Equipment node (RE).

SUMMARY

It is an object of embodiments described herein to address at least some of the problems and issues outlined above. It is possible to achieve this object and others by using a method and a transition device as defined in the attached independent claims.

According to one aspect, a method is performed by a transition device for enabling communication of data between a remote radio unit and a central baseband unit in a wireless network. In this method, the transition device detects a first interface configuration used by the remote radio unit, and also detects a second interface configuration used by the baseband unit. The transition device then configures one or more interface functions, based on the detected first and second interface configurations, the one or more interface functions being selected from a set of pre-defined interface functions associated with different interface configurations. The transition device further establishes at least one data flow between the remote radio unit and the central baseband unit over the transition device, and performs conversion between the first interface configuration and the second interface configuration for data communicated in the at least one data flow, using the selected one or more interface functions.

According to another aspect, a transition device is arranged to enable communication of data between a remote radio unit and a central baseband unit in a wireless network. The transition device is configured to detect a first interface configuration used by the remote radio unit, and to detect a second interface configuration used by the central baseband unit. The transition device is also configured to configure one or more interface functions, based on the detected first and second interface configurations, the one or more interface functions being selected from a set of predefined interface functions associated with different interface configurations. The transition device is further configured to establish at least one data flow between the remote radio unit and the central baseband unit over the transition device, and to perform conversion between the first interface configuration and the second interface configuration for data communicated in the at least one data flow, using the selected one or more interface functions.

It is an advantage that the transition device is a single transition point that effectively interconnects any number of remote radio units to any baseband unit in an automated and flexible manner. Another advantage is that the transition device performs conversion between any interface configurations that might be used by the remote radio units and the baseband unit, respectively. Further, no manual adaptations are necessary when a new remote radio unit is connected to a baseband unit, or when an existing remote radio unit or a baseband unit is modified in some way, regardless of which interface configuration is used by either unit.

The above method and transition device may be configured and implemented according to different optional embodiments to accomplish further features and benefits, to be described below.

Even though some embodiments have been summarized above, the claimed subject matter is defined in the attached claims 27-48.

BRIEF DESCRIPTION OF DRAWINGS

The solution will now be described in more detail by means of exemplary embodiments and with reference to the accompanying drawings, in which.

DETAILED DESCRIPTION

Figure 1:
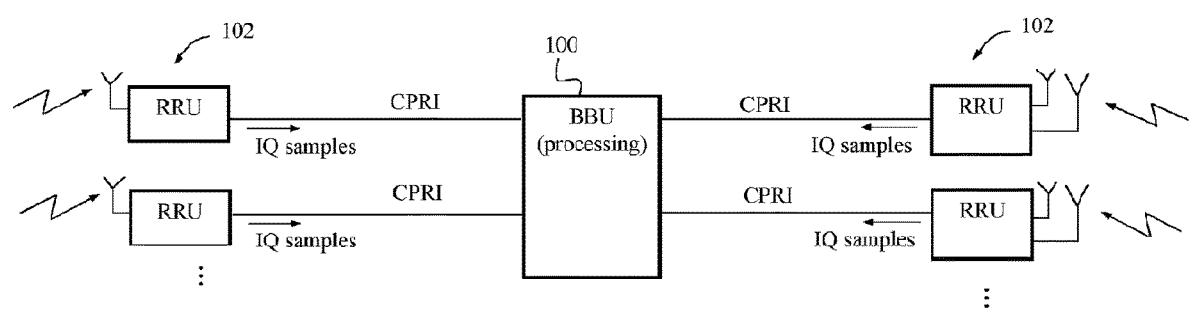
FIG. 1 is a network scenario illustrating how interfaces are employed between a baseband unit and different remote radio units, according to the prior art.
Figure 2:
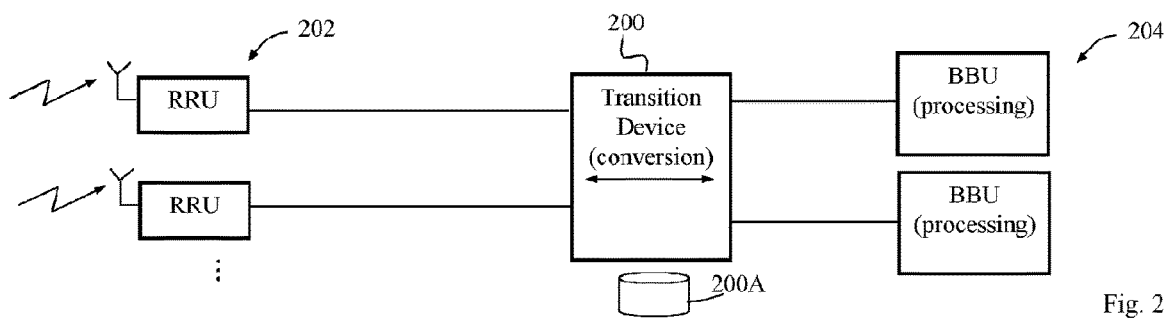
FIG. 2 is a network scenario illustrating an example of how the solution may be employed by means of a transition device, according to some example embodiments.

Briefly described, a solution is provided to avoid the need for manual adaptations e.g. when a new RRU is connected to a BBU in a wireless network, or when an RRU or a BBU is modified in terms of capabilities and functionality, regardless of which interface configuration is used by either of the RRU and the BBU. This can be achieved by means of a transition device which connects an RRU to a BBU, e.g. as illustrated in FIG. 2 where a transition device 200 is able to connect any RRU 202 to any BBU 204 and automatically establish a data flow between them using suitable interface configurations as follows.

For example, when an RRU 202 is connected, the transition device 200 identifies or selects a BBU 204 to handle signal processing for the RRU, and detects which interface configurations are used by the RRU 202 and by the BBU 204, respectively. For example, the transition device may detect attached BBUs by "snooping" the data protocol used. Further, ports on the transition device 200 can be configured manually, which means that the device can be informed if an RRU or BBU is connected on a particular port and which interface type the port should be configured to. This type of information may be maintained in a database 200A. The transition device 200 accordingly configures interface functions for the two detected interface configurations, which interface functions are selected from a set of predefined interface functions associated with different interface configurations. Such predefined interface functions may also be available from the database 200A which basically maps various known interface configurations to respective interface functions required for communication on the interfaces.

A data flow is then established between the RRU 202 and the BBU 204 over the transition device 200, and conversion is performed between the interface configuration used by the RRU 202 and the interface configuration used by the BBU 204. Data is thereby communicated in said data flow using the selected interface functions. It should be noted that data flows can be established between several RRUs and a single BBU, and the solution is not limited in this respect. In this case, multiplexing and de-multiplexing of multiple data flows can be made in the transition device.

Even though the term "Remote Radio Unit, RRU" is used throughout this disclosure it could be replaced by the term "distributed unit" or the term "local unit", and the term "Central Baseband Unit, BBU" could be replaced by the term "central unit".

Examples of interface configurations that may occur in this context include:

1) the above-mentioned Common Public Radio Interface CPRI,
2) the above-mentioned evolved Common Public Radio Interface eCPRI,
3) an interface for conveying compressed data which interface in this description will be referred to as "C1" for short,
4) an intra-physical layer split interface which in this description will be referred to as "C2" for short, and
5) a physical layer/MAC layer split interface which in this description will be referred to as "C3" for short.

The above interface configurations as such are described in detail in the technical report 3GPP TR 38.801 V2.0.0 (2017-3) where "option 8" described in chapter 11.1.2.8 corresponds to the C1 interface and the CPRI, "option 7" described in chapter 11.1.2.7 corresponds to the C2 interface, and "option 6" described in chapter 11.1.2.6 corresponds to the C3 interface.

In short, the C1 interface is a packet-based interface between the RF layer and the PHY layer, the C2 interface is within the PHY layer thus splitting the PHY layer into two parts, and the C3 interface is between the PHY layer and the MAC layer. The C1 interface carries time-domain IQ samples which may be compressed, the C2 interface may carry frequency-domain signals at least partly processed at the PHY layer, and the C3 interface may carry user data, configuration and scheduling-related information and measurements. For the downlink, the baseband signal becomes an RF signal after up-conversion. In the uplink, an RF signal is down-converted to baseband signal which is then compressed and transported over the C1 interface.

The transition device 200 thus provides interconnection and conversion between any interface configurations used by RRUs and one or more BBUs in a flexible manner and the establishment of such interface conversion is made automatically once the RRU 202 is connected to the transition device 200 and starts to receive and forward radio signals. The transition device 200 can be defined by means of software and can be implemented either on the RRU side or on the BBU side. It is also possible to implement the transition device 200 as split into two parts, one part operating on the RRU side and another part operating on the BBU side, and use a packet network as an "intermediate interface configuration" for data transport between the two transition device parts, which will be described in more detail below. The intermediate interface configuration may alternatively be referred to as a packet network configuration or packet interface configuration.

In short, the transition device effectively provides useful external interfaces that are automatically adapted to the connected RRU and the appointed BBU, respectively. The transition device can for example be initialized as software on a multi-purpose processor to provide any necessary interface and forwarding functions such as framing, switching/multiplexing, stream aggregation and extraction, packet manipulation, data compression, synchronization, etc.

Figure 3:
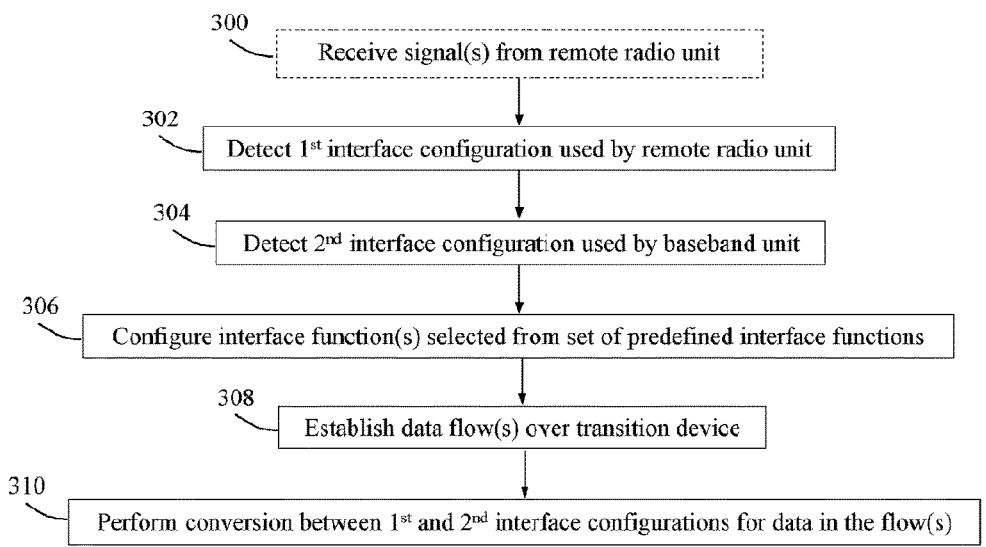
FIG. 3 is a flow chart illustrating a procedure in a transition device, according to further example embodiments.

An example will now be described with reference to the flow chart in FIG. 3, of how the solution may be employed in terms of actions performed by a transition device such as the above-described transition device 200. FIG. 3 is described below with further reference to FIG. 2 although without limitation to such a communication scenario.

Some optional example embodiments that could be used in this procedure will also be described below. The procedure may be employed when the transition device 200 is operating in any type of wireless network and any suitable techniques, protocols and standards may be employed by the transition device 200 for communication in this network, e.g. as exemplified below.

At least some of the actions shown in FIG. 3 are thus performed by a transition device 200, for enabling communication of data between a remote radio unit 202 and a central baseband unit 204 in a wireless network. A first action 300 illustrates that the transition device 200 may receive one or more signals from the remote radio unit 202 which has an antenna receiving radio signals from a radio transmitter such as a wireless device.

In a further action 302, the transition device 200 detects a first interface configuration used by the remote radio unit 202. This interface configuration may be detected from the signals received in action 300, or by some other input to the transition device 200 related to the remote radio unit 202, e.g. manual input. In another action 304, the transition device 200 also detects a second interface configuration used by the baseband unit 204. Similarly, this interface configuration may be detected from the signals received in action 300 from the remote radio unit 202. If the baseband unit 204 is manually configured to communicate with a given remote radio unit 202, it is possible to connect them over the transition device 200 by snooping data on both interfaces. Alternatively or additionally, the second interface configuration may be detected from signals or messages received from the baseband unit 204, or by some other input to the transition device 200 related to the baseband unit 204, e.g. manual input.

It should be noted that it may be suitable to perform action 304 before action 302, specifically as the baseband unit 204 can be regarded as a "master" for the remote radio unit 202. The order of actions 302 and 304 may thus be reversed and the solution is not limited to any particular order of detecting the first and second interfaces.

A next action 306 illustrates that the transition device 200 configures one or more interface functions, based on the detected first and second interface configurations. In this action, the one or more interface functions are selected from a set of predefined interface functions associated with different interface configurations. Such a set of predefined interface functions may be available and accessed from a data storage 200A or the like, as said above.

In another action 308, the transition device 200 establishes at least one data flow between the remote radio unit 202 and the central baseband unit 204 over the transition device 200. In this action, a communication path is thus created through the transition device 200 so as to connect the remote radio unit 202 to the central baseband unit 204 so that the data flow runs over this communication path. The transition device 200 also performs conversion between the first interface configuration and the second interface configuration for data communicated in the at least one data flow, using the selected one or more interface functions, as illustrated by another action 310. The above actions may be carried out in different ways which will be exemplified below.

It is thus an advantage that the transition device 200 can be used as a single transition point that interconnects any number of RRUs to any BBU in an automated and flexible manner, and that the transition device 200 is able to perform conversion between any interface configurations that might be used by the RRU and the BBU, respectively.

Some further example embodiments and features of the above procedure will now be outlined. In one example embodiment, the first and second interface configurations may be detected in actions 302, 304 based on one or more signals received from the remote radio unit 202. For example, when the remote radio unit 202 has been connected to the transition device 200 and starts to receive radio signals from a wireless device or the like, these signals are conveyed to the transition device 200 which is able to determine from the received signals which interface configurations are used by the remote radio unit 202 and the central baseband unit 204. In general, a BBU may be configured to operate with a particular set of RRUs. So when an RRU is connected to a BBU, an initial handshaking may be conducted by the units where they exchange their identities and capabilities. Being located between the units, the transition device is able to listen to the exchanged information so that it can learn which RRUs belong to which BBU.

In some other example embodiments, the first interface configuration may comprise a Common Public Radio Interface CPRI or an interface C1 for conveying compressed data. In further example embodiments, the second interface configuration may comprise any of an evolved Common Public Radio Interface eCPRI, an interface C1 for conveying compressed data, an intra-physical layer split interface C2 and a physical layer/MAC layer split interface C3. The above interface configurations have been defined above with reference to 3GPP TR 38.801 V2.0.0 (2017-3).

It was mentioned above that the transition device 200 may be split into two parts, one part operating on the RRU side and another part operating on the BBU side, and that a packet network may then be used as an intermediate interface configuration for packet transport between the two transition device parts. In another example embodiment, conversion between the first interface configuration and an intermediate interface configuration which is adapted for a packet network may be performed by a first part of the transition device 200, and conversion between said intermediate interface configuration and the second interface configuration may be performed by a second part of the transition device 200. As a result, the transition device 200 performs the conversion between the first and second interface configurations in action 310 via the intermediate interface configuration which is adapted for a packet network. In another example embodiment, the data may in that case be transported over the packet network between said first and second parts of the transition device, using the intermediate interface configuration.

An example of how the transition device 200 can be split in two parts will be described later below with reference to FIG. 6. In further example embodiments, the above intermediate interface configuration may comprise any of an evolved Common Public Radio Interface eCPRI, an interface C1 for conveying compressed data, an intra-physical layer split interface C2 and a physical layer/MAC layer split interface C3. In another example embodiment, the intermediate interface configuration may have been preconfigured in beforehand or it may be selected based on the first and second interface configurations and/or based on properties of the packet network.

It was mentioned above that the transition device 200 can be implemented as software on a multi-purpose processor. In further example embodiments, the one or more interface functions may be configured as Virtualized Network Functions VNFs. In that case, another example embodiments, may be that the Virtualized Network Functions could be implemented in a software-defined data processing unit in the transition device 700.

In further example embodiments, the one or more interface functions may comprise any of: CPRI related functions, eCPRI related functions, multiplexing/de-multiplexing and switching functions, and packet forwarding functions. An example of how these interface functions may be arranged will be described later below with reference to FIG. 7.

In further example embodiments, the one or more interface functions may be related to signal processing which may include any of: Fast Fourier Transform (FFT), beam forming, and compression/decompression.

Figure 4:
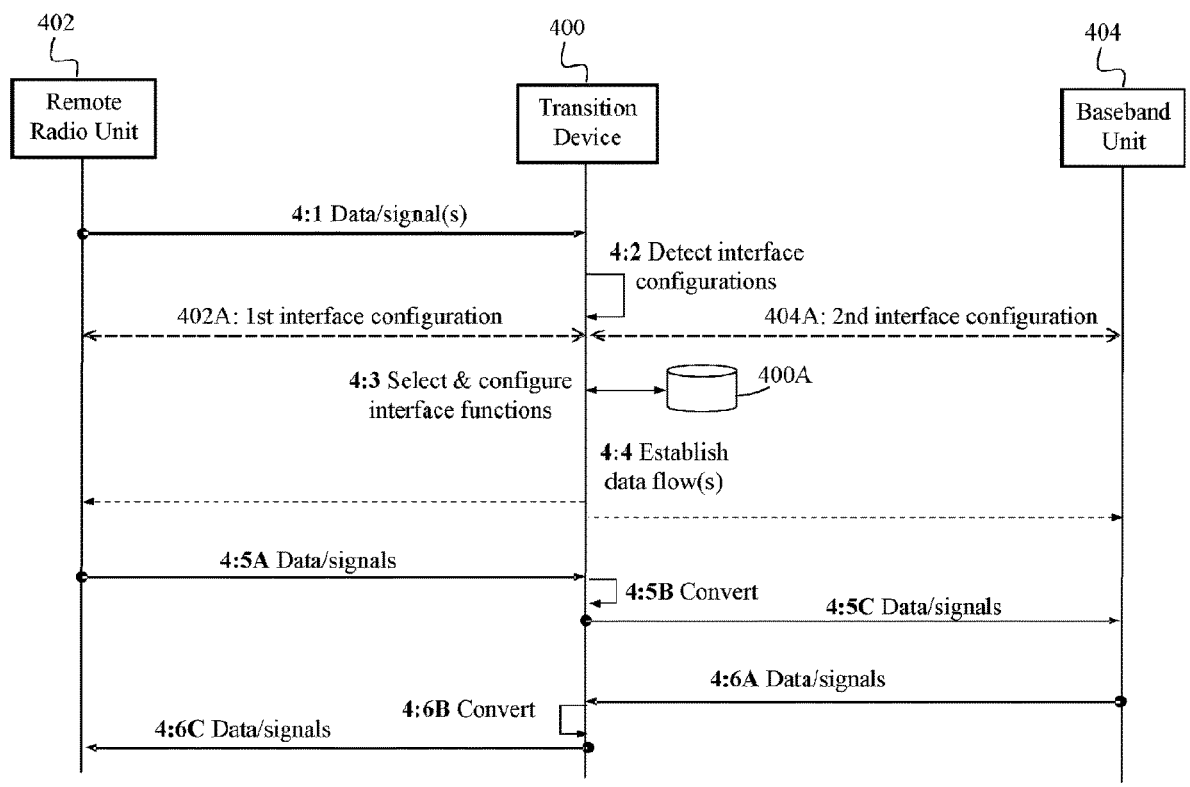
FIG. 4 is a signaling diagram illustrating an example of a procedure when the solution is used, according to further example embodiments.

Another example of how the above-described transition device may operate in a practical communication scenario will now be described with reference to the signaling diagram in FIG. 4. In this example, the transition device 400 interconnects a remote radio unit 402 and a baseband unit 404. A first action 4:1 illustrates that the transition device 400 initially receives a signal carrying data from the remote radio unit 402 having received the signal from a wireless device, not shown, which corresponds to action 300. Thereby, the transition device 400 is able to detect a first interface configuration 402A used by the remote radio unit 402 and a second interface configuration 404A used by the baseband unit 404, jointly illustrated by an action 4:2. This action corresponds to actions 302 and 304.

In a next action 4:3, the transition device 400 selects and configures interface functions, based on the detected first and second interface configurations, which corresponds to action 306. The interface functions are selected from a data storage 400A where a set of predefined interface functions associated with different interface configurations are being stored.

In a further action 4:4, the transition device 400 establishes one or more data flows between the remote radio unit 402 and the baseband unit 404 over the transition device 400. This action thus corresponds to action 308. A further action 4:5A illustrates that the transition device 400 receives further uplink signals carrying data from the remote radio unit 402 over the first interface configuration in the data flow. The transition device 400 also performs conversion between the first interface configuration and the second interface configuration for the received data signals in action 4:5B, and forwards the converted data signals to the baseband unit 404 over the second interface configuration in action 4:5C. Actions 4:5A-C are thus executed as long as the data flow is active in an uplink communication.

In a corresponding manner, the transition device 400 receives downlink signals carrying data from the baseband unit 404 over the second interface configuration in another data flow, as illustrated by a further action 4:6A. The transition device 400 also performs conversion between the second interface configuration and the first interface configuration for the received data signals in action 4:6B, and forwards the converted data signals to the remote radio unit 402 over the first interface configuration in action 4:6C. The downlink signals are then transmitted from the remote radio unit 402 to be received by a wireless device, not shown. Actions 4:6A-C are thus executed as long as the data flow is active in the downlink communication.

Figure 5A:
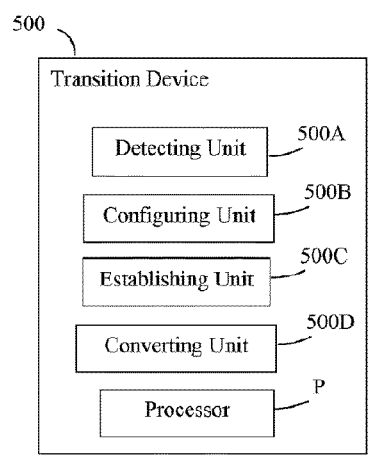
FIGS. 5 and 5A are block diagrams illustrating how a transition device may be structured, according to further example embodiments.
Figure 5:
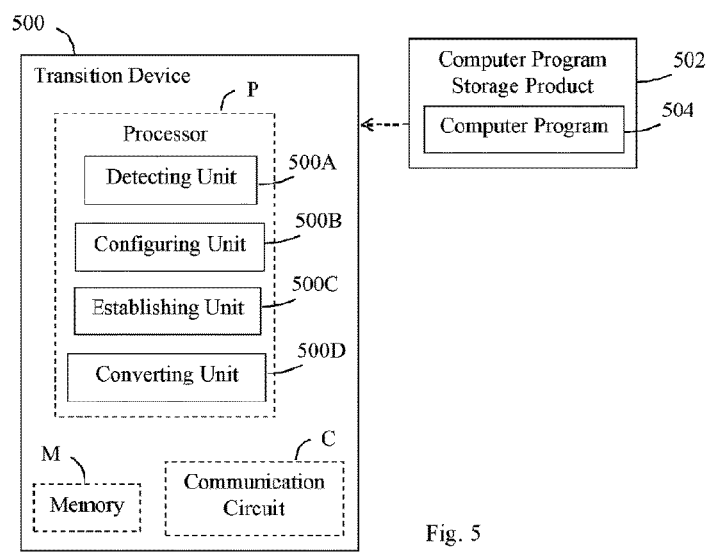

The block diagram in FIG. 5 illustrates a detailed but non-limiting example of how a transition device 500 may be structured to bring about the above-described solution and embodiments thereof. The transition device 500 may be configured to operate according to any of the examples and embodiments of employing the solution as described herein, where appropriate and as follows. The transition device 500 is shown to comprise a processor P and a memory M, said memory comprising instructions executable by said processor P whereby the transition device 500 is operable as described herein. The transition device 500 also comprises a communication circuit C with suitable equipment for transmitting and receiving signals in the manner described herein.

The communication circuit C is configured for communication with remote radio units and baseband units using suitable protocols and interfaces depending on how the respective remote radio units and baseband units are operating. Such communication may be performed over wired or optical links depending on the implementation, which is not necessary to describe here as such in any detail. The solution and embodiments herein are thus not limited to using any specific types of networks, technology or protocols for signal communication.

The transition device 500 comprises means configured or arranged to perform at least some of the actions 300-310 in FIG. 3 and more or less in the manner described above for the transition devices 200 and 400. The transition device 500 is arranged or configured to enable communication of data between a remote radio unit and a central baseband unit in a wireless network, such as the remote radio unit 202, 402 and the central baseband unit 204, 404.

The transition device 500 is configured to detect a first interface configuration used by the remote radio unit 202. This operation may be performed by a detecting unit 500A in the transition device 500, e.g. in the manner described for action 302 above. The transition device 500 is also configured to detect a second interface configuration used by the central baseband unit 204. This operation may be performed by the detecting unit 500A, e.g. in the manner described for action 304 above.

The transition device 500 is further configured to configure one or more interface functions, based on the detected first and second interface configurations, the one or more interface functions being selected from a set of predefined interface functions associated with different interface configurations, such as the above-described predefined interface functions 400A. This operation may be performed by a configuring unit 500B in the transition device 500, e.g. as described for action 306 above. The configuring unit 500B could alternatively be named a control unit, selecting unit or interface unit.

The transition device 500 is also configured to establish at least one data flow between the remote radio unit 202 and the central baseband unit 204 over the transition device 200. This operation may be performed by an establishing unit 500C in the transition device 500, e.g. as described above for action 308. The establishing unit 500C could alternatively be named a flow unit or setup unit.

The transition device 500 is also configured to perform conversion between the first interface configuration and the second interface configuration for data communicated in the at least one data flow, using the selected one or more interface functions. This operation may be performed by a converting unit 500D in the transition device 500, e.g. as described above for action 310. The converting unit 500D could alternatively be named a translating unit.

It should be noted that FIG. 5 illustrates various functional modules or units in the transition device 500, and the skilled person is able to implement these functional modules or in practice using suitable software and hardware. Thus, the solution is generally not limited to the shown structures of the transition device 500, and the functional units or modules 500A-D therein may be configured to operate according to any of the features and embodiments described in this disclosure, where appropriate.

Another example of how the transition device 500 may be configured is schematically shown in the block diagram of FIG. 5A. In this example, the transition device 500 comprises the functional modules 500A-D and a processor P, the modules 500A-D being configured to operate in the manner described above as controlled by the processor P.

The functional modules or units 500A-D described above can be implemented in the transition device 500 by means of suitable hardware and program modules of a computer program comprising code means which, when run by the processor P causes the transition device 500 to perform at least some of the above-described actions and procedures.

In either of FIG. 5 and FIG. 5A, the processor P may comprise a single Central Processing Unit (CPU), or could comprise two or more processing units such as CPUs. For example, the processor P may include a general purpose microprocessor, an instruction set processor and/or related chip sets and/or a special purpose microprocessor such as an Application Specific Integrated Circuit (ASIC). The processor P may also comprise a storage for caching purposes.

Each computer program may be carried by a computer program product in the transition device 500 in the form of a memory having a computer readable medium and being connected to the processor P. The computer program product or memory in the transition device 500 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program products in the form of memories within the transition device 500.

The solution described herein may be implemented in the transition device 500 by means of a computer program product 502 comprising a computer program 504 with computer readable instructions which, when executed on the transition device 500, cause the transition device 500 to carry out the actions and features according to any of the above embodiments, where appropriate.

Some non-limiting but illustrative examples of how the above-described transition device 200, 400, 500 may be realized in practice will now be described with reference to FIGS. 6-10.

Figure 6:
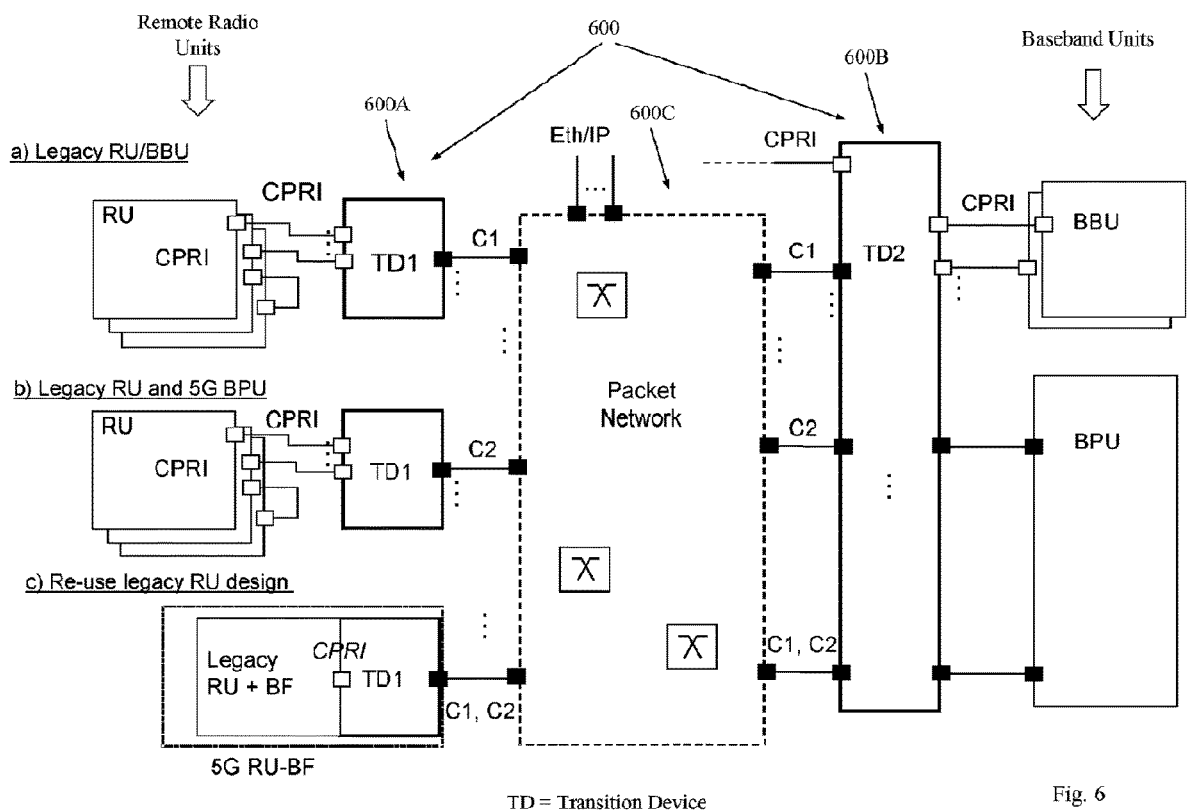
FIG. 6 illustrates three example communication scenarios where the transition device is divided into a first part and a second part, according to further example embodiments.

In FIG. 6, three example communication scenarios are illustrated where a transition device 600 is divided into a first part 600A and a second part 600B to employ the above-described embodiments involving an intermediate interface configuration which is adapted for communication over a packet network 600C. In this figure, the first part 600A of the transition device is denoted TD1 and the second part 600B of the transition device is denoted TD2. Further, remote radio units are denoted RU and central baseband units are denoted BBU or BPU meaning Baseband Processing Unit. In these examples, the first part 600A is implemented basically at the RUs and the second part 600B is implemented basically at the BBUs.

The first communication scenario a) involves legacy RUs and BBUs where the RUs use CPRI as the first interface configuration and the BBUs also use CPRI as the second interface configuration. The TD1 of the first part 600A converts between CPRI of the RUs and C1 which is used as the intermediate interface configuration for communication over the packet network 600C. The TD2 of the second part 600B converts between the intermediate interface configuration C1 and CPRI used by the BBUs.

The second communication scenario b) involves legacy RUs and a 5G BPU where the RUs use CPRI as the first interface configuration and the BPU also use CPRI as the second interface configuration. The TD1 of the first part 600A converts between CPRI of the RUs and C2 which is used as the intermediate interface configuration for communication over the packet network 600C. The TD2 of the second part 600B converts between the intermediate interface configuration C2 and CPRI used by the BPU.

The third communication scenario c) involves a reused legacy RU design with the TD1 integrated therein, and a 5G BPU. The RU uses CPRI internally as the first interface configuration and the BPU also use CPRI as the second interface configuration. The TD1 of the first part 600A is thus integrated into the RU and converts between CPRI and either of C1 and C2 which is used as the intermediate interface configuration for communication over the packet network 600C. The TD2 of the second part 600B converts between the intermediate interface configuration C1 or C2 and CPRI used by the BPU.

Figure 7:
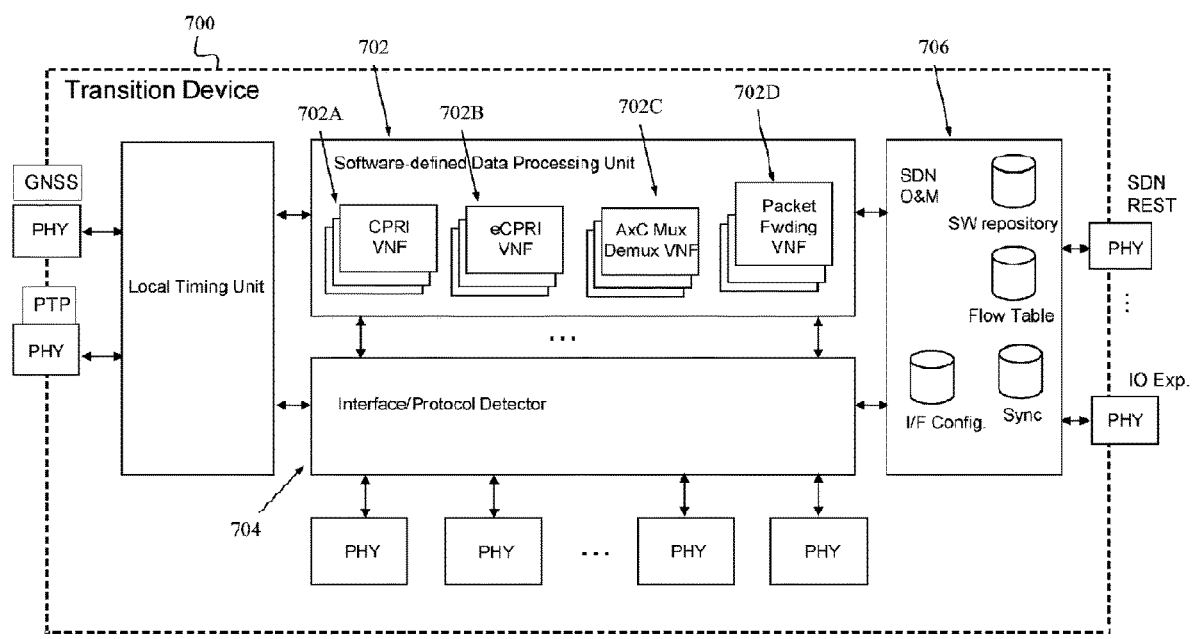
FIG. 7 is a block diagram illustrating a more detailed example of how a transition device may be structured, according to further example embodiments.

FIG. 7 illustrates how a transition device 700 may be structured when some of the above-described embodiments are employed. In this example, the interface functions are configured as Virtualized Network Functions VNFs which are implemented in a software-defined data processing unit 702 in the transition device 700. The interface functions comprise CPRI related functions 702A, eCPRI related functions 702B, multiplexing/de-multiplexing and switching functions 702C, and packet forwarding functions 702D. Further details in this figure are described below.

To implement the Physical Layer PHY, the transition device 700 offers several interfaces that can be equipped with a common pluggable transceiver, like SFP/SFP+/QSFP in BASE-T or BASE-X flavor.

An Interface/Protocol detector 704 is employed to configure interfaces according to different interface types, e.g. CPRI, C1, C2, C3, eCPRI, and to establish a corresponding VNF chain and data flows.

The CPRI-related VNFs 702A may be employed as CPRI framers separating or framing time-domain IQ AxC containers, synchronization data, as well as Operation & Maintenance O&M data. Also, different forms for compression, such as IQ resampling, Huffman coding, etc., may be employed to generate IQ content for a C1 interface.

The eCPRI related VNFs 702B may be employed as functions to convert AxCs from time-domain samples to frequency domain-samples by using (inverse) Fourier Transforms. A beam forming processor, not shown, may handle any beamforming related functions such UL/DL beam creation (BTA/ATB math) coefficient calculations, and uplink channel sounding (capture of spatial information). Also, compression functions as well as weight coefficients may be applied on frequency samples.

The multiplexing/de-multiplexing and switching functions 702C may be employed for multiplexing and de-multiplexing of AxCs from one CPRI stream to another.

The packet forwarding functions 702D may be employed as a Packet Flow Switch or Forwarding engine. In the packet domain, eCPRI data (AxC, C1, or C2) are framed according to IEEE 802.1Q, using Ethernet ports in accordance to IEEE 802.3 Ethernet. All AxCs to one radio unit (MIMO layers, spatial layers) can be interleaved into the same frame or have to be transmitted with the same time-sensitive network (TSN) flow profile.

O&M and Sync 706 may be employed to provide Software Defined Network SDN controller interfacing based on REST or Netconf. It contains a SW repository where the VNFs are stored for staging in a service chain. It also maintains the flow-table for AxC switch and packet forwarding. It also maintains the interface configurations.

Some further practical examples of how the transition device may be structured for conversion between different interfaces will now be briefly outlined.

Figure 8:
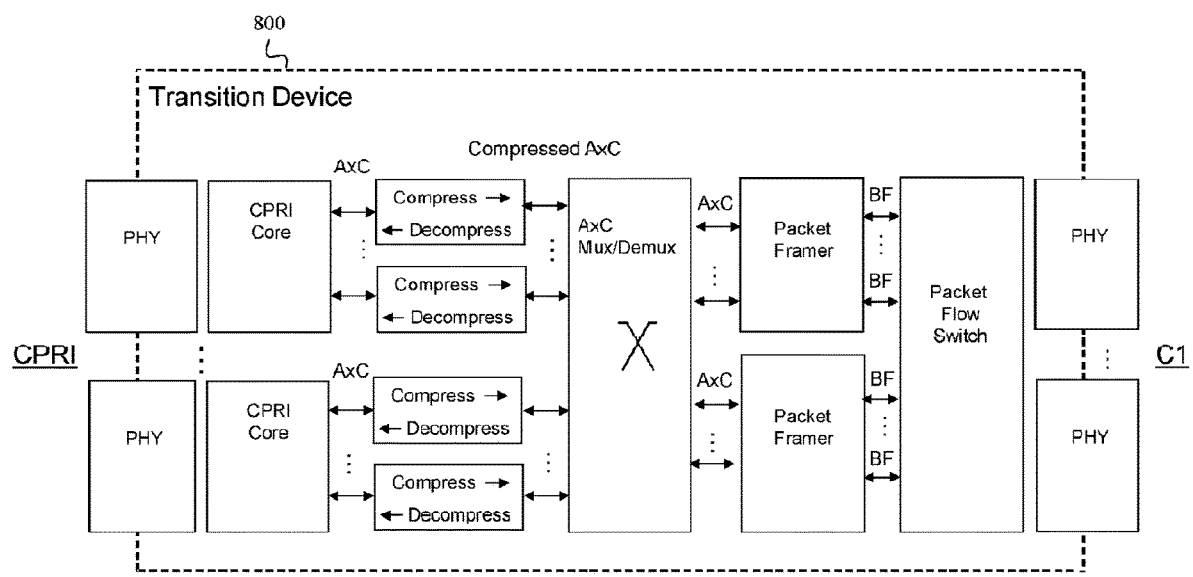
FIG. 8 is a block diagram illustrating an example of how a transition device may be structured for conversion between a CPRI interface configuration and a C1 interface configuration, according to further example embodiments.

FIG. 8 illustrates how a transition device 800 may be structured for conversion between a CPRI interface configuration towards the left side of the transition device 800, and a C1 interface configuration towards the right side of the transition device 800.

Figure 9:
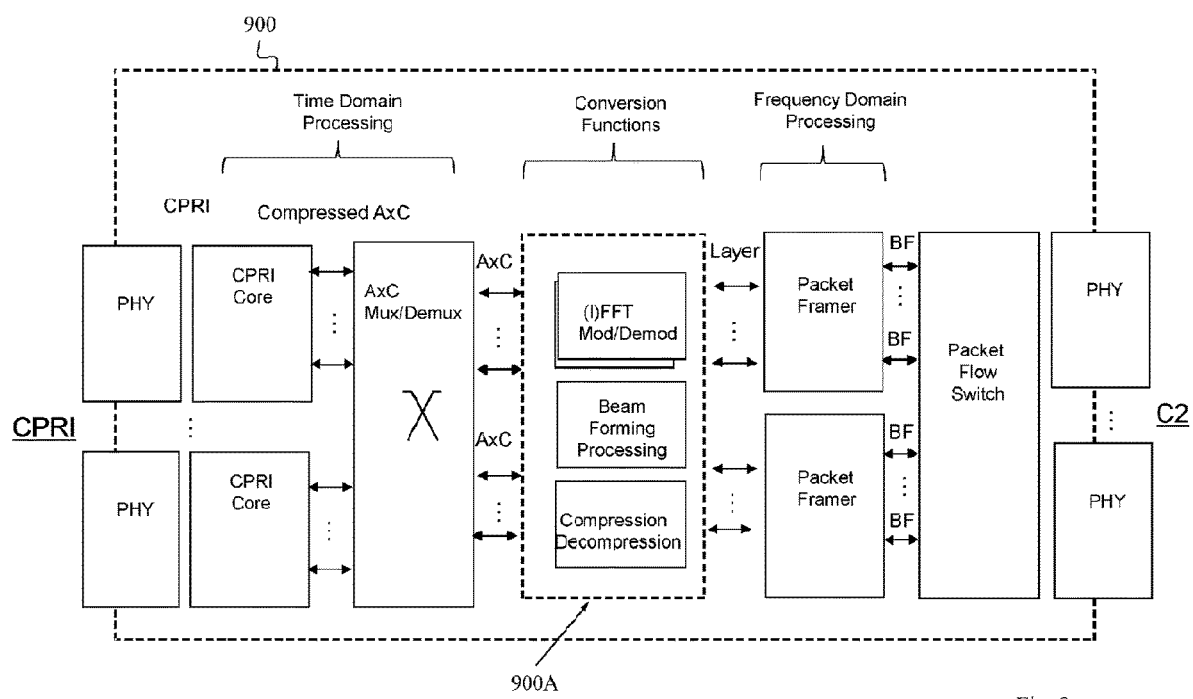
FIG. 9 is a block diagram illustrating an example of how a transition device may be structured for conversion between a CPRI interface configuration and a C2 interface configuration, according to further example embodiments.

FIG. 9 illustrates how a transition device 900 may be structured for conversion between a CPRI interface configuration towards the left side of the transition device 900 and a C2 interface configuration towards the right side of the transition device 900. The transition device 900 comprises a set of conversion functions 900A. Processing in time domain and in frequency domain are also indicated in this figure.

Figure 10:
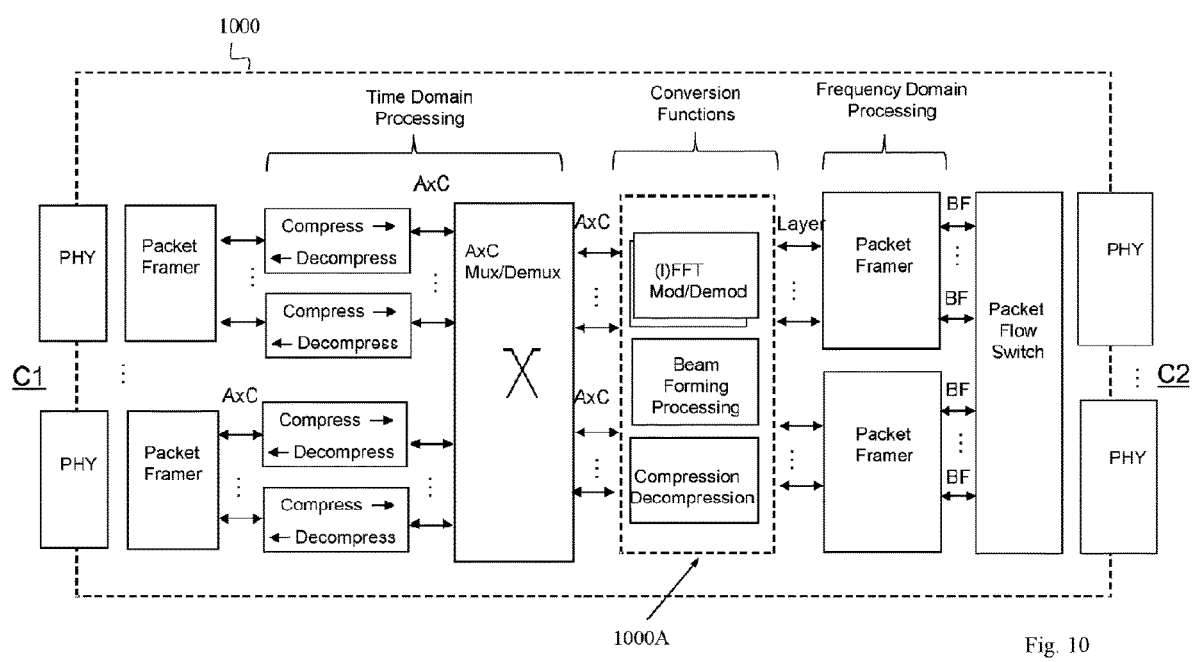
FIG. 10 is a block diagram illustrating an example of how a transition device may be structured for conversion between a C1 interface configuration and a C2 interface configuration, according to further example embodiments.

FIG. 10 illustrates how a transition device 1000 may be structured for conversion between a C1 interface configuration towards the left side of the transition device 1000 and a C2 interface configuration towards the right side of the transition device 1000. The transition device 1000 comprises a set of conversion functions 1000A. Processing in time domain and in frequency domain are also indicated in this figure.

While the solution has been described with reference to specific exemplifying embodiments, the description is generally only intended to illustrate the inventive concept and should not be taken as limiting the scope of the solution. For example, the terms "transition device", "remote radio unit", "central baseband unit", "interface configuration", "interface function" and "data flow" have been used throughout this disclosure, although any other corresponding entities, functions, and/or parameters could also be used having the features and characteristics described here. The solution is defined by the appended claims.

The invention claimed is:

1. A method performed by a transition device for enabling communication of data between a remote radio unit and a central baseband unit in a wireless network, the method comprising:
    detecting a first interface configuration used by the remote radio unit,
    detecting a second interface configuration used by the baseband unit,
    configuring one or more interface functions, based on the detected first and second interface configurations, the one or more interface functions being selected from a set of predefined interface functions associated with different interface configurations,
    establishing at least one data flow between the remote radio unit and the central baseband unit over the transition device, and
    performing conversion between the first interface configuration and the second interface configuration for data communicated in the at least one data flow, using the selected one or more interface functions, wherein
    conversion between the first interface configuration and an intermediate interface configuration adapted for a packet network is performed by a first part of the transition device, and conversion between the intermediate interface configuration and the second interface configuration which is different from the first interface configuration is performed by a second part of the transition device, and
    the data is transported over the packet network between said first and second parts of the transition device, using the intermediate interface configuration.

2. A method according to claim 1, wherein the first and second interface configurations are detected based on one or more signals received from the remote radio unit.

3. A method according to claim 1, wherein the first interface configuration comprises a Common Public Radio Interface (CPRI) or an interface (C1) for conveying compressed data.

4. A method according to claim 1, wherein the second interface configuration comprises any of an evolved Common Public Radio Interface (eCPRI), an interface (C1) for conveying compressed data, an intra-physical layer split interface (C2) and a physical layer/MAC layer split interface (C3).

5. A method according to claim 1, wherein the intermediate interface configuration comprises any of an evolved Common Public Radio Interface (eCPRI), an interface (C1) for conveying compressed data, an intra-physical layer split interface (C2) and a physical layer/MAC layer split interface (C3).

6. A method according to claim 1, wherein the intermediate interface configuration has been preconfigured or is selected based on the first and second interface configurations and/or based on properties of the packet network.

7. A method according to claim 1, wherein the one or more interface functions are configured as Virtualized Network Functions (VNFs).

8. A method according to claim 7, wherein the Virtualized Network Functions are implemented in a software-defined data processing unit in the transition device.

9. A method according to claim 1, wherein the one or more interface functions comprise any of: CPRI related functions, eCPRI related functions, multiplexing/de-multiplexing and switching functions, and packet forwarding functions.

10. A method according to claim 1, wherein the one or more interface functions are related to signal processing including any of: Fast Fourier Transform (FFT), beam forming, and compression/decompression.

11. A transition device arranged to enable communication of data between a remote radio unit and a central baseband unit in a wireless network, the transition device comprising:
    one or more processors configured to:
        detect a first interface configuration used by the remote radio unit,
        detect a second interface configuration used by the central baseband unit,
        configure one or more interface functions, based on the detected first and second interface configurations, the one or more interface functions being selected from a set of predefined interface functions associated with different interface configurations,
        establish at least one data flow between the remote radio unit and the central baseband unit over the transition device, and
        perform conversion between the first interface configuration and the second interface configuration for data communicated in the at least one data flow, using the selected one or more interface functions, wherein
        the transition device comprises a first part configured to perform conversion between the first interface configuration and an intermediate interface configuration adapted for a packet network, and a second part configured to perform conversion between the intermediate interface configuration and the second interface configuration which is different from the first interface configuration, and
        the transition device is configured to transport the data over the packet network between said first and second parts, using the intermediate interface configuration.

12. A transition device according to claim 11, wherein the transition device is configured to detect the first and second interface configurations based on one or more signals received from the remote radio unit.

13. A transition device according to claim 11, wherein the first interface configuration comprises a Common Public Radio Interface (CPRI) or an interface (C1) for conveying compressed data.

14. A transition device according to claim 11, wherein the second interface configuration comprises any of an evolved Common Public Radio Interface (eCPRI), an interface (C1) for conveying compressed data, an intra-physical layer split interface (C2) and a physical layer/MAC layer split interface (C3).

15. A transition device according to claim 11, wherein the intermediate interface configuration comprises any of an evolved Common Public Radio Interface (eCPRI), an interface (C1) for conveying compressed data, an intra-physical layer split interface (C2) and a physical layer/MAC layer split interface (C3).

16. A transition device according to claim 11, wherein the intermediate interface configuration has been preconfigured, or the transition device is configured to select the intermediate interface configuration based on the first and second interface configurations and/or based on properties of the packet network.

17. A transition device according to claim 11, wherein the one or more interface functions are configured as Virtualized Network Functions (VNFs).

18. A transition device according to claim 17, wherein the Virtualized Network Functions are implemented in a software-defined data processing unit in the transition device.

19. A transition device according to claim 11, wherein the one or more interface functions comprise any of: CPRI related functions, eCPRI related functions, multiplexing/de-multiplexing and switching functions, and packet forwarding functions.

20. A transition device according to claim 11, wherein the one or more interface functions are related to signal processing including any of: Fast Fourier Transform (FFT), beam forming, and compression/decompression.

21. A non-transitory computer-readable medium storing instructions that, when executed by one or more processors, cause the one or more processors to:

detect a first interface configuration used by a remote radio unit, detect a second interface configuration used by a baseband unit, configure one or more interface functions, based on the detected first and second interface configurations, the one or more interface functions being selected from a set of predefined interface functions associated with different interface configurations, establish at least one data flow between the remote radio unit and the central baseband unit over a transition device, and perform conversion between the first interface configuration and the second interface configuration for data communicated in the at least one data flow, using the selected one or more interface functions, wherein conversion between the first interface configuration and an intermediate interface configuration adapted for a packet network is performed by a first part of the transition device, and conversion between the intermediate interface configuration and the second interface configuration which is different from the first interface configuration, is performed by a second part of the transition device, and the data is transported over the packet network between said first and second parts of the transition device, using the intermediate interface configuration.

\* \* \* \* \*